2 Sheets--Sheet 2.
C. CUSTER.
Grain-Cleaners and Scourers.
No. 153,318. Patented July 21, 1874.
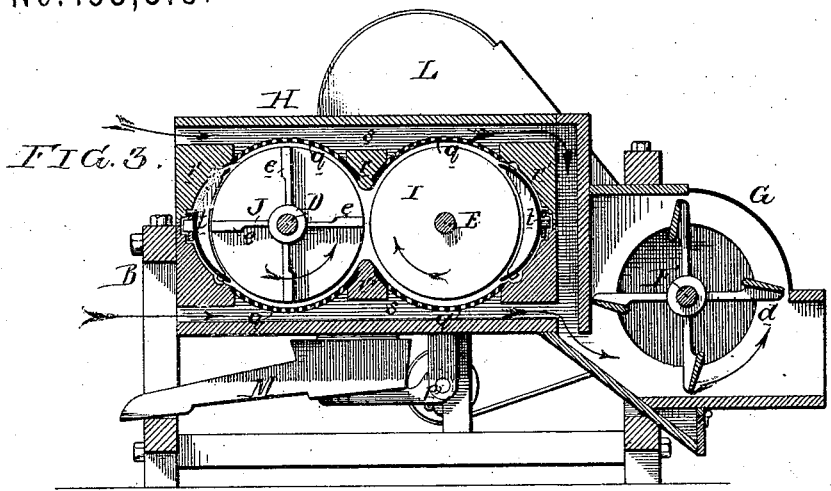
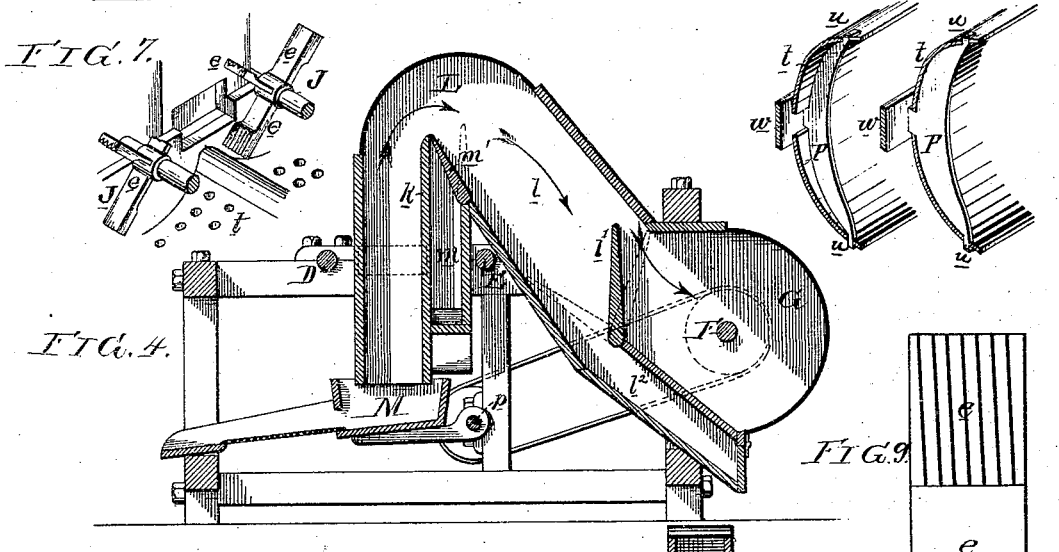
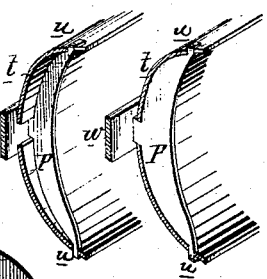
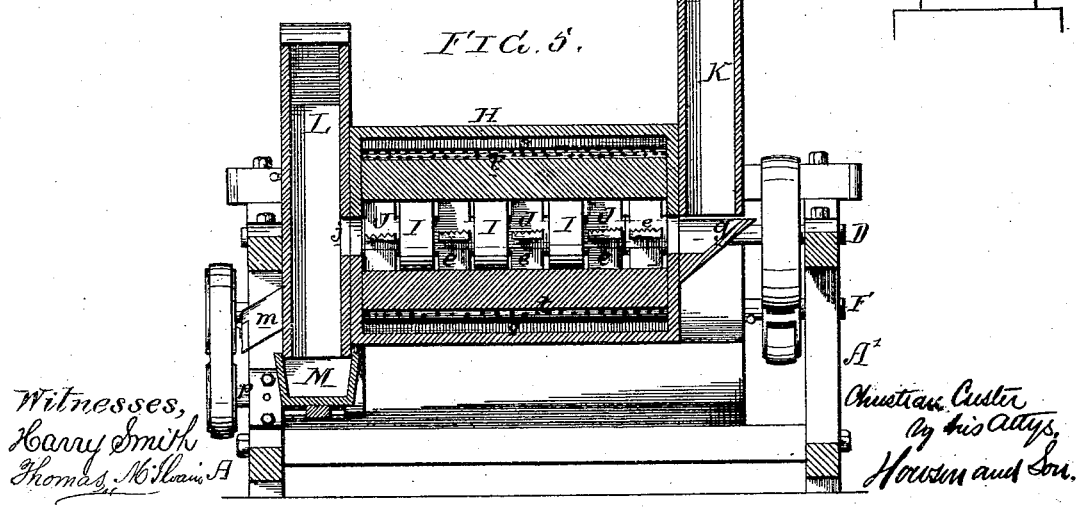
Witnesses,
Harry Smith
Thomas McSloan
Christian Custer
By his Attys,
Howson and Son
THE GRAPHIC CO. PHOTO-LITH. 39 & 41 PARK PLACE, N.Y.

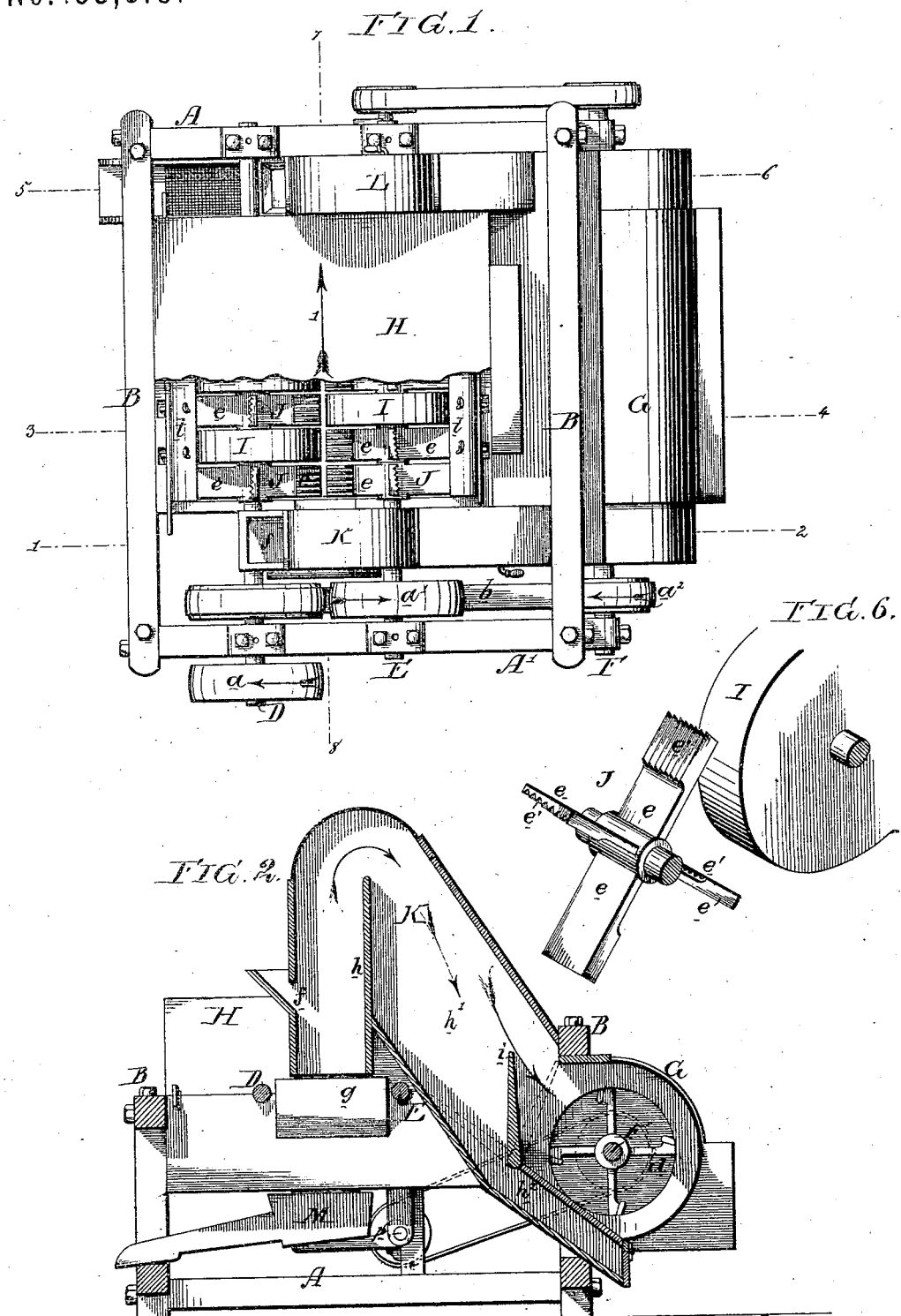

UNITED STATES PATENT OFFICE.

CHRISTIAN CUSTER, OF PHILADELPHIA, PENNSYLVANIA.

IMPROVEMENT IN GRAIN CLEANERS AND SCOURERS.

Specification forming part of Letters Patent No. 153,318, dated July 21, 1874; application filed February 21, 1874.

*To all whom it may concern:*

Be it known that I, CHRISTIAN CUSTER, of Philadelphia, Pennsylvania, have invented a Grain Cleaning and Separating Machine, of which the following is a specification:

The object of my invention is to clean wheat and other grain to make it smooth, and to separate from it light particles, smut, dust, and other foreign matter, by the machine which I will now proceed to describe, reference being had to the accompanying drawing, in which—

Figure 1, Sheet 1, is a plan view of the machine, with a portion of the top removed; Fig. 2, Sheet 1, a sectional elevation on the line 1 2, Fig. 1; Fig. 3, Sheet 2, a sectional elevation on the line 3 4, Fig. 1; Fig. 4, Sheet 2, a sectional elevation on the line 5 6, Fig. 1; Fig. 5, Sheet 2, a transverse sectional elevation on the line 7 8, Fig. 1; Fig. 6, Sheet 1, a detached perspective view of part of the machine drawn to an enlarged scale; and Figs. 7, 8, and 9, Sheet 2, detached views of other portions of the machine.

The opposite side frames A and A' of the machine are connected together by cross-bars B, and in suitable bearings in the said side frames turn three parallel shafts, D, E, and F, the former of which is the driving-shaft, and has a pulley, $a$, from which, through the medium of a belt, $b$, and other pulleys, $a^1$ and $a^2$, motion is transmitted to the shafts E and F. (See Figs. 1 and 3.) On the shaft F, within a casing, G, is a fan or fans, $d$, and on the shafts D and E, within a casing, H, adjoining the casing G, and occupying the whole central portion of the machine, are a series of grindstones, I, alternated with beaters or stirrers J, each composed, in the present instance, of four radial arms, $e$, and more particularly referred to hereafter. (See Figs. 1, 3, and 5.) At one side of the casing H is a narrow vertical casing, K, provided with a hopper, $f$, Fig. 2, and communicating, through an inclined chute, $g$, best observed in Fig. 5, with the interior of the said casing H, at a point midway between the shafts D and E. The casing K has also a vertical partition, $h$, and downwardly-inclined passage $h^1$, the upper portion of which communicates with the fan-casing G, and the lower portion with a receptacle, $h^2$. (See Fig. 2.) An adjustable valve, $i$, is interposed between the said passage $h^1$ and the fan-casing for a purpose explained hereafter. At the opposite end of the casing H, and communicating with the same through a narrow aperture, $j$, Figs. 4 and 5, is a casing, L, nearly similar to the casing K, above described, as it has a vertical portion, $k$, and a downwardly-inclined passage, $l$, provided with a valve, $l^1$, and communicating with the fan-casing and with a receptacle, $l^2$. The inclined passage $l$ also communicates with another receptacle, $m$, adjoining the vertical portion $k$ of the casing, and provided at the top with a valve, $m'$. Immediately beneath the lower open end of the vertical portion of the casing L is a sifting-frame, M, to which the required reciprocating movement is imparted by a short crank-shaft, $p$, operated from the fan-shaft F, through the medium of a belt and pulleys. The internal construction of the central casing H of the machine will be best observed on reference to Fig. 3, where it will be seen that the grindstones I and beaters J are contained within an internal chamber having walls composed of curved plates $q$ of perforated sheet metal or wire-gauze secured to cross-pieces $r$ and $r'$. Above and below this chamber are passages $s\ s$, communicating at one end with the external air, and at the opposite end with the fan-casing G. As before remarked, the grindstones I and beaters J alternate upon the shafts D and E, and they are so arranged that a beater upon one shaft shall be directly opposite a grindstone upon the adjoining shaft, as shown in Fig. 6, excepting at the ends of the series, where two beaters are placed directly opposite each other, as shown in Fig. 7. The arms $e$ of the beaters are of the same width as the grindstones, and upon one side of each of the said arms are formed parallel grooves $e'$, which may occur at the ends of the arms only, as shown in Fig. 6, or extend throughout their entire length. These grooves may be parallel with the sides of the arms, but I prefer to incline them slightly, as shown in Fig. 9, for a purpose explained hereafter. To the inner sides of the cross-pieces $r\ r$ of the casing H are secured curved plates $t\ t$, Figs. 3 and 8, to which, at the points $u$, are pivoted a series of curved vanes, P, the vanes of each series being attached to a sliding bar, *w*, by the adjustment of which they can be simultaneously inclined in one direction or the other.

On turning the driving-shaft D in the direction of its arrow motion will be transmitted to the shaft E and fan-shaft F in the direction of their respective arrows, a shaking motion will be imparted to the sifting-frame M, and a strong draft in the direction of the arrows will be produced in the casings K, H, and L.

The wheat or other grain to be cleaned and smoothed is first introduced into the casing K through the hopper *f*, when the dust, smut, and lighter foreign particles will be immediately separated from it by the action of the fan, and caused to pass over the partition *h* and through the inclined passage $h^1$, the valve *i* being so adjusted as to permit the dust only to pass into and through the fan-casing, while the heavier particles enter the receptacle $h^2$. The wheat passes through the inclined chute *g* into the internal chamber of the casing H, and is at once submitted to the action of the stirrers or beaters J and grindstones I, by which it is thrown from one side to the other, and at the same time is gradually moved across the machine in the direction of the arrow 1, Fig. 1, partly by the slight inclination of the grooves *e′* of the beaters, and partly by the vanes P, which may be set at any angle which the desired accelerating or retarding of this passage of the grain may suggest.

The beaters or stirrers not only overturn and cause the grains of wheat to be rubbed against each other, and to be submitted to the action of the stones, and to be thus smoothed and polished, but also present the ends of the said grains to the stones, owing to the arrangement of the grooves *e′* in the arms of the beaters, within which the grains when lifted will adjust themselves longitudinally, and will consequently, when projected outward from the beaters by centrifugal action, be caused to strike the stones end foremost, the rough projections of the hulls, which are always most prominent at the ends of the grains, being thus entirely ground off by the time the grain reaches the outlet-opening *j*. The dust caused by the grinding and smoothing operations passes through the perforations of the plates *t t*, and is carried off through the passages *s* into and through the fan-casing. From the stones and beaters the grain passes through the opening *j* into the casing L, within which light grains, dust, and foreign particles, which may have remained with the sound grain thus far, are separated therefrom by the action of the fan and carried off, some of these particles entering the receptacle *m* and others the receptacle $l^2$. The cleaned grain falls onto the sifting-frame M, by which particles detached from the germ-end, &c., are separated in the usual manner, the perfect grain passing finally from the end of said frame into any suitable receptacle.

I claim as my invention—

1. In a grain-cleaning machine, the combination, substantially as described, of the parallel shafts D and E, their grindstones I, and the beaters or stirrers J, whereby the grain may be thrown back and forth from the grindstones of one shaft to those of the other.

2. The beaters provided with the grooves *e′*, arranged so as to present the ends of the grain to the grindstones, substantially as and for the purpose described.

3. The combination, substantially as described, of the vanes P with the beaters and grindstones.

4. The casing H, its beaters and grindstones contained within an internal chamber having walls of perforated plate or wire-gauze, and the air-passages *s*, all substantially as and for the purposes described.

5. The casing L, communicating with the discharge-opening and with the fan-casing, the receptacles *m* and $l^2$, downwardly-inclined passage *l*, and valves *m′ l¹*, combined as described.

6. The combination of the central casing H, containing grain agitating and polishing mechanism, and the fan-casing G and casings K L, communicating with the central and fan casings, as set forth.

In testimony whereof I have signed my name to this specification in the presence of two subscribing witnesses.

CHRISTIAN CUSTER.

Witnesses:
  WM. A. STEEL,
  HARRY SMITH.